US012302471B2

(12) United States Patent
Marcucci et al.

(10) Patent No.: US 12,302,471 B2
(45) Date of Patent: May 13, 2025

(54) LIGHTING DEVICE PRODUCING AT LEAST TWO MODES HAVING DIFFERENT SPECTRAL PROPERTIES

(71) Applicant: Alliance Sports Group, L.P., Roanoke, TX (US)

(72) Inventors: Todd Lee Marcucci, Mansfield, TX (US); Wallace Andrew Kluck, Richardson, TX (US)

(73) Assignee: Alliance Sports Group, L.P., Roanoke, TX (US)

( * ) Notice: Subject to any disclaimer, the term of this patent is extended or adjusted under 35 U.S.C. 154(b) by 0 days.

(21) Appl. No.: 18/361,613

(22) Filed: Jul. 28, 2023

(65) Prior Publication Data

US 2024/0057239 A1 Feb. 15, 2024

Related U.S. Application Data

(63) Continuation-in-part of application No. 17/888,032, filed on Aug. 15, 2022, now Pat. No. 11,796,140.

(51) Int. Cl.

| | |
|---|---|
| ***H05B 47/17*** | (2020.01) |
| ***F21L 4/02*** | (2006.01) |
| ***F21V 9/40*** | (2018.01) |
| ***H05B 45/10*** | (2020.01) |
| *F21Y 113/13* | (2016.01) |
| *F21Y 115/10* | (2016.01) |

(52) U.S. Cl.
CPC .............. *H05B 47/17* (2020.01); *F21L 4/027* (2013.01); *F21V 9/40* (2018.02); *H05B 45/10* (2020.01); *F21Y 2113/13* (2016.08); *F21Y 2115/10* (2016.08)

(58) Field of Classification Search
CPC .......... F21V 9/00; F21V 9/40; F21Y 2113/00; F21Y 2113/10; F21Y 2115/10; H05B 45/10; H05B 47/17
See application file for complete search history.

(56) References Cited

U.S. PATENT DOCUMENTS

| | | | |
|---|---|---|---|
| 7,497,590 | B2 | 3/2009 | Rains, Jr. et al. |
| 7,517,107 | B2 | 4/2009 | Dallas et al. |
| 7,621,653 | B2 | 11/2009 | Hendrie |
| 7,682,037 | B1 | 3/2010 | Hose et al. |
| 7,988,318 | B1 | 8/2011 | Smith et al. |
| 8,113,681 | B2 | 2/2012 | Dallas et al. |
| 9,410,879 | B1 | 8/2016 | Hose |
| 2017/0181244 | A1 | 6/2017 | Shur et al. |
| 2018/0198036 | A1 | 7/2018 | Horie |
| 2018/0309031 | A1 | 10/2018 | Horie |
| 2020/0175247 | A1 | 6/2020 | Weaver |
| 2021/0360756 | A1 | 11/2021 | Gadegaard |

OTHER PUBLICATIONS

PCT Application No. PCT/US2023/072101 filing date Aug. 11, 2023, Todd Lee Marcucci, International Search Report Mailing Date Dec. 14, 2023; 4 pages.

*Primary Examiner* — Robert J May
(74) *Attorney, Agent, or Firm* — Thorpe North & Western, LLP; Jed H. Hansen

(57) ABSTRACT

A method of operating a lighting device is disclosed for providing power to a light source that has at least two modes of operation. Each mode of operation propagates a beam of light having different spectral characteristics, wherein when the two modes are operated, the total spectral output enhances a visual characteristic of a target within an area surrounding the target. A first mode of the at least two modes is a dulling mode and a second mode of the at least two modes is a vivifying mode.

18 Claims, 11 Drawing Sheets

LIGHTING DEVICE PRODUCING AT LEAST TWO MODES HAVING DIFFERENT SPECTRAL PROPERTIES

PRIORITY CLAIM

The present application is a continuation-in-part to U.S. Ser. No. 17/888,032 filed on Aug. 15, 2022 entitled "Lighting Device" which is incorporated herein by reference in its entirety.

FIELD OF THE INVENTION

The present invention relates generally to lighting devices, systems, and associated methods and more particularly to an improved apparatus and system for providing an improved lighting device for identifying objects with specific radio wavelength absorption, refraction, and/or reflection properties.

BACKGROUND

Lighting devices are commonly used for multiple purposes. However, several disadvantages in current lighting are overcome by aspects of the current technology. Including, but without limitation, the ability to better identify objects in the environment that have specific wavelength or color absorption/reflection/refraction property and the ability to optimize the attendant advantages for different users with varying degrees or capabilities of visual acuity. Other advantages are apparent in the description of aspects of the technology.

BRIEF DESCRIPTION OF THE DRAWINGS

To further clarify the above and other aspects of the present technology, a more particular description of the invention will be rendered by reference to specific aspects thereof which are illustrated in the appended drawings. It is appreciated that these drawings depict only typical aspects of the technology and are therefore not to be considered limiting of its scope. The drawings are not drawn to scale. The technology will be described and explained with additional specificity and detail through the use of the accompanying drawings in which.

DESCRIPTION OF ASPECTS

Figure 1:
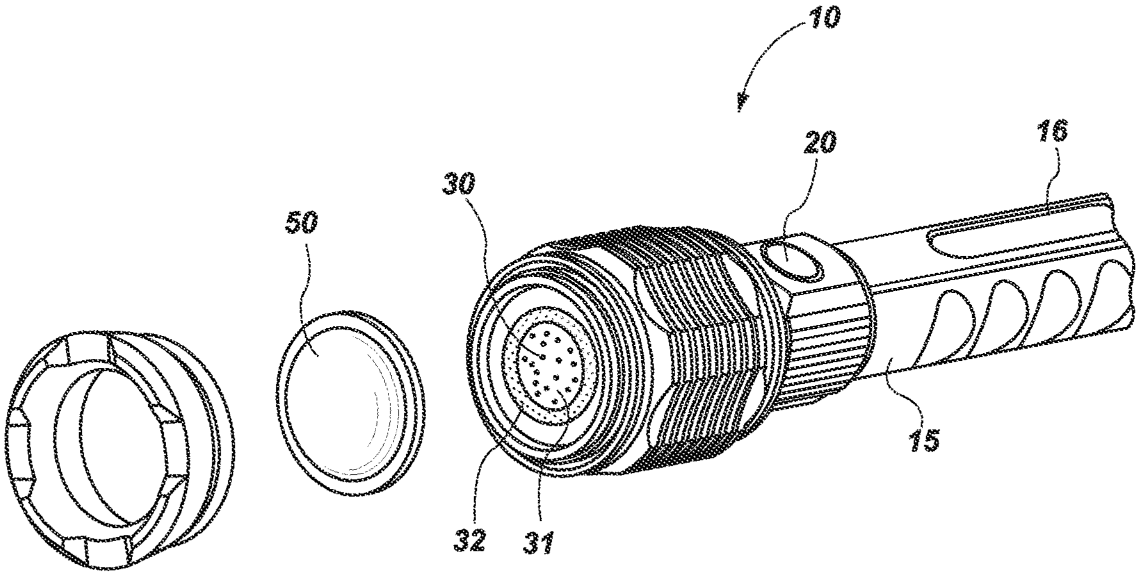
FIG. 1 is a perspective side view of a lighting device in accordance with one aspect of the technology.

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

EXAMPLE EMBODIMENTS

An initial overview of technology embodiments is provided below and specific technology embodiments are then described in further detail. This initial summary is intended to aid readers in understanding the technology more quickly, but is not intended to identify key or essential features of the technology, nor is it intended to limit the scope of the claimed subject matter.

Broadly speaking, aspects of the disclosed technology create an improved lighting apparatus and related methods that improve the ability of a user to detect objects with specific light absorption and/or reflection characteristics. In one non-limiting example, aspects of the technology improve the user's ability to observe blood in an environment exterior to the body without the need for ultraviolet light. In its barest form, aspects of the technology "dull" certain wavelengths of light within the light beam propagated from a light source. In this manner, certain objects within the beam of light are perceived by the user to be emphasized or more easily discernable. Moreover, in certain aspects of lighting technology, the ability to adjust the settings such that persons with varying degrees of visual acuity can manually change the rate or type of "dulling."

Generally speaking, aspects of the technology relate to a lighting unit or device capable of making a useful dynamic lighting effect on an external target or scene. In one aspect, the lighting device comprises a plurality of light sources and a control system capable of selectively feeding power to said light sources.

The plurality of light sources and said control system are capable of switching between a plurality of spectral modes, each of said spectral modes providing light output of a characteristic spectral makeup at some level of brightness. In one aspect, each of said spectral modes is created by the control system directing power to an individual single member of, or a subset of, said light sources. In one aspect, the set of said spectral modes includes one spectral mode referred to as a "dulling mode," having the effect of providing a diminishing or darkening of the appearance of some color or range of colors in a target or scene. The diminishing or darkening is accomplished through a deficiency in the portion of the spectrum that would produce a more vivid appearance of said color or range of colors. In one aspect, one of the set of said spectral modes includes one spectral mode referred to as a "vivifying mode," having the effect of providing a level of vividness to said color, or range of colors, that is substantially greater than that provided by the "dulling mode." The dulling mode and vivifying mode, during operation, together show similarity of perceived color under direct viewing or as seen illuminating a white surface.

In one aspect, the dulling mode and vivifying mode provide light of similar intensity. In another aspect, the characteristic spectral makeup of the light produced in at least one of the spectral modes is chosen to appear as some shade of white to a typical viewer. In another aspect, the characteristic spectral makeup of the light produced in at least one of the spectral modes is chosen to appear as some shade of yellow to a typical viewer.

In other aspect of the technology, one of said spectral modes is able to provide enhancement of, or to increase vividness of, the color or colors being sought for detection, relative to the vividness level that would be achieved under uniform-spectrum white light or a typical white LED. In another aspect, the spectral modes are produced by a plurality of LEDs of different types, powered by a control system which for each spectral mode powers a single diode or a subset of the diodes at a controlled brightness for each.

In one aspect of the technology, the useful nature of said unit stems from its ability to make hard-to-see blood drops hidden in said target or scene appear to flash red, as the unit switches modes between a dulling mode which is deficient in the wavelengths needed to emphasize the color of blood, and a vivifying mode producing a spectrum engineered to be an improvement, in vividness of blood stain visibility, relative to a common whitish light spectrum. As noted further herein, however, it can also be used from artistic or theatrical applications in providing a light source which makes certain pigmented items in said target or scene vary in hue or color intensity, while maintaining a generally constant coloration over time upon direct viewing. It can also make certain pigmented items in a target or scene vary in hue or color intensity, while maintaining a generally constant coloration over time upon viewing of the light as cast on objects or backgrounds which are of colors other than the target.

More specifically, aspects of the technology are directed towards the propagation of a plurality of wavelengths of light or "wavelength segments" or "wavelength blocks" at varying intensity levels in a "vivid" phase or mode followed by the propagation of a plurality of wavelength segments or blocks at varying intensity levels in a "dulling" phase or mode. The vivid phase (or mode) and the dulling phase (or mode) are implemented at duty cycles such that when the two are juxtaposed, the human eye perceives a single coherent beam of light. In one aspect, the duty cycles are implemented in such a way that the dulling phase and the vivid phase do not substantially overlap. Meaning, generally speaking, when the vivid phase is "on" or active, the dulling phase is "off" or inactive, though in some cases there may be some overlap so long as the objective of emphasizing a target with specific wavelength properties is achieved. Moreover, in one aspect, the relative duty cycles may be adjusted by each user so that individual visual acuity levels may be matched to the individual user. Advantageously, while the relative duty cycle or intensity of the different phases may be adjusted, the ratio of intensity levels between wavelength segments or blocks in a vivid phase remains fixed. Likewise, the relative ratio of intensity levels between wavelength segments or blocks in a dulling phase remain fixed. In addition, in other aspects of the technology, the user may switch between operating modes to adjust the wavelength characteristics of the vivid and/or dulling phase whereby the wavelength segments themselves represent different wavelengths of light at the same or different intensities as other modes. But in any particular mode, as noted herein, the ratio of intensity levels between different wavelength blocks in the same phase remains fixed.

With reference now to the figures, FIG. 1 illustrates one example of a hand-held lighting device 10, though tethered devices or non-hand-held devices may be used to propagate light in accordance with aspects of the technology. The lighting device 10 generally comprises an outside housing 15 configured with a cavity for a rechargeable power source (e.g., a battery) disposed within a handle 16 of the device 10. The housing further comprises a second cavity with a light source 30 and a lens 50 disposed therein. In one aspect of the device, the light source 30 comprises a plurality of light emitting diodes (LEDs) and/or chip-on-board (COB) LEDs which specifically refers to LED chips in the form of a semiconductor chip that is neither encased nor connected but directly mounted onto a substrate, such as a printed circuit board (PCB). As such, a plurality of semiconductor light sources may be configured on the same substrate. In one aspect, the plurality of diodes are distributed about the light source 30 at different densities. For example, in one aspect the light source 30 comprises an inner section 31 with a plurality of LEDs at a first density and an outer section 32 with a plurality of LEDs at a second density.

While reference is made herein to COB LED lights, aspects of the technology are not limited to that specific aspect. Different LED lights/light sources may suffice so long as the light source 30 operates to provide the different wavelength blocks or segments at the duty cycles noted herein with the ratio of intensity levels herein. While the term LED is used herein in connection with a light source, it is understood that a single LED may be used as the light source or a plurality of LEDs with similar capabilities may be used. Similar LEDs may be disposed on a similar chip or substrate or they may be disposed on different chips and different substrates and disposed about different locations of the housing as suits a particular design. Meaning, LEDs with similar characteristics may be located about numerous different locations of the device. Moreover, other light sources may be used besides LEDs. It is also understood that LEDs capable of operating at different wavelengths of light or only wavelength blocks or segments may be used. In one aspect, an RGB chip is used as the light source 30. In one aspect, an RGB chip comprises three different LED emitters in one case. Each emitter is connected to a separate lead so they can be controlled independently.

In one aspect, the housing 15 further comprises a power switch 20, a control switch, and a logic controller such as a programmable logic controller or PLC. The control switch is also coupled to the PLC and permits the user to switch between different modes of operation including, but without limitation, switching between varying vivid modes and dulling modes. A PLC is a digital computer used for automation of certain electromechanical processes, such as control of machinery on factory assembly lines, amusement rides, or light fixtures. PLCs are designed for multiple arrangements of digital and analog inputs and outputs, extended temperature ranges, immunity to electrical noise, and resistance to vibration and impact. In one aspect of the technology, the instructions to control operation of the lighting device operation are stored in battery-backed-up or non-volatile memory. Memory refers to electronic circuitry that allows information, typically computer data, to be stored and retrieved.

As will be appreciated by one skilled in the art, aspects of the present technology may be embodied as a system, method or computer program product used in connection with a lighting device. Accordingly, aspects of the present technology may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a random access memory (RAM), a read-only memory (ROM), an erasable programmable read-only memory (EPROM or Flash memory), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present technology may be written in any combination of one or more programming languages, including an object-oriented programming language such as Java, Visual Basic, SQL, C++ or the like and conventional procedural programming languages, such as the "C" programming language or similar programming languages.

In one aspect of the technology, the light sources or LEDs are configured with pulse-width modulation ("PWM") to regulate the brightness or dimness of specific LED lights. PWM is one way of regulating the brightness of a light. Thus, for one phase a user may select a first PWM mode and in a different phase a user may select a second PWM mode such that different LED lights on the same chip (or different chips) have different levels of dimness or brightness. In one aspect, light emission from the LED is controlled by pulses wherein the width of these pulses is modulated to control the amount of light perceived by the end user. When the full direct current voltage runs through an LED, the maximum of light is emitted 100% of the time. That is, the LED emits light 100% of the time when in an "on" mode. With PWM, the voltage supplied to the LED can be "on" 50% of the time and "off" 50% of the time so that the LED gives off its maximum amount of light only 50% of the time. This is referred to as a 50% duty cycle. In this scenario, if the on-off cycle is modulated fast enough, human eyes will perceive only half the amount of light coming from the LED. That is, with such an input on the LED, the amount of light given off appears diminished by 50%. While specific reference is made to a 50% duty cycle, the LED duty cycle of the light source described herein may be greater or lesser than 50% as suits a particular purpose. For example, the LED(s) propagating light at different wavelength segments (an LED "vivid block" and/or LED "dulling block") may have a duty cycle that ranges from 25% to 40%, 40% to 50%, 50% to 60%, and/or 60% to 75%. They may also have duty cycles that range from 20% to 25%, 25% to 30%, 30% to 35%, 35% to 40%, 40% to 45%, 45% to 50%, 50% to 55%, 55% to 60%, 60% to 65%. 65% to 70%, 70% to 75%, 75% to 80%, 80% to 85%, 85% to 90%, 90% to 95%, and/or 95% to 100%. The range may of course include more than the ranges provided herein and may include a greater range or a smaller range.

In one aspect of the technology, the on-off cycle (i.e., the rate at which the LEDs in a vivid phase and/or dulling phase are turned on and off) is greater than about 8 KHz to about 10 KHz. In another aspect of the technology, the on-off cycle ranges from about 1 KHz to about 8 KHz. In another aspect, the on-off cycle ranges from about 0.001 KHz to about 1 KHz. In yet another example, the on-off cycle ranges from about 0.002 KHz to 0.004 KHz. In one aspect, the on-off cycle for the vivid phase and dulling phase are substantially the same. However, in one aspect the vivid phase has an on-off cycle greater than the dulling phase and vice versa.

In one aspect, light source 30 is configured to operate with a preset plurality of duty cycles. Meaning, the vivid source operates at a first duty cycle (e.g., 25%, 50%, etc.) for a first period of time (e.g., 5 s, 10 s, 15 s, etc.) and the dulling source operates at a second duty cycle (e.g., 25%, 50%, etc.) for a second period of time (e.g., 5 s, 10 s, or 15 s, etc.). In one aspect, the length of first and second periods of time (i.e., the vivid interval and dulling interval) are substantially the same. In another aspect, however, the length of the respective intervals are different. Meaning, the vivid interval may be greater than the dulling interval or vice versa. In one aspect of the technology, time period over which the first time interval and the second time interval operate are separate from one another. In other words, they do not overlap. For example, the first time interval may begin at time 0 s and end at time 5 s wherein the second time interval may begin at time 5 s (or 5.01 s) and end at time 10.01 s. However, in other aspects of the technology, the time intervals may overlap. For example, the first time interval may begin at time 0 s and end at time 5 s wherein the second time interval may begin at time 4.5 s and end at time 9.5 s.

It is important to note that while reference is made herein to a vivid source of LEDs and a dulling source of LEDs, the vivid source and dulling source are not required to be different LEDs. In one aspect of the technology, the vivid source and dulling source may be the same LEDs capable of propagating light at the different wavelength segments disclosed. In another aspect, the vivid source and dulling source are different LEDs. In another aspect, the vivid source and dulling source may share some LEDs while also having separate LEDs in their respective sources.

In another aspect of the technology, the lighting devices comprise LEDs wherein a first frequency of light (or wavelength block or segment) is propagated from the LEDs for a first period of time (e.g., 5 s, 10 s, or 15 s), a second frequency of light (or wavelength block or segment) is propagated from the LEDs for a second period of time, and a third frequency of light (or wavelength block or segment) is propagated from the LEDs for a third period of time. The first, second, and third periods of time may be the same, or they may be different as suits a particular purpose. There may be some overlap between the different time periods or they may be no overlap as suits a particular purpose. In an additional aspect, the different frequencies are propagated from different LEDs and not necessarily from the same LED or the same group of LEDs. For example, in one aspect, light is propagated from the vivid source at 440-460 nm for 0.05 seconds, at 510-540 nm for 0.05 seconds, and then 640-660 nm for 0.05 seconds in series for 0.3 seconds. In another aspect, light is propagated from the vivid source at 440-460 nm for 0.05 seconds, at 510-540 nm for 0.05 seconds, and then 640-660 nm for 0.08 seconds for 0.36 seconds. That pattern is repeated for a period of time in a predetermined or user-selected duty-cycle juxtaposed with light propagated from the dulling source.

With reference to FIGS. 2-5, different non-limiting examples of vivid and dulling spectra are disclosed in accordance with different aspects of the technology. FIG. 2*a* discloses a plurality of wavelength segments or blocks of the vivid spectrum comprising a first vivid wavelength segment or block 40 ranging from about 440-460 nm, a second vivid wavelength or block 41 ranging from about 510-540 nm, and a third vivid wavelength segment or block 42 ranging from about 640-660 nm. FIG. 2*a* also discloses the relative intensity of the different segments to one another. For example, the relative intensity of the first and second segments 40, 41 are substantially the same. However, the third block 42 has a greater intensity than the first and second blocks. In the example in FIG. 2*a*, the intensity is not shown in any particular unit of measure. Rather, it is disclosed as a ratio of intensity with respect to one another. In the vivid spectrum disclosed in FIG. 2*a*, for example, the first and second wavelength segments 40, 41 are about 0.75 the intensity of the third block 42. In one aspect of the technology, if the intensity of the light propagated from the vivid source is increased or decreased, the relative ratio of the intensities of the different wavelength segments or blocks within the vivid spectrum to one another remains the same.

Figure 2A:
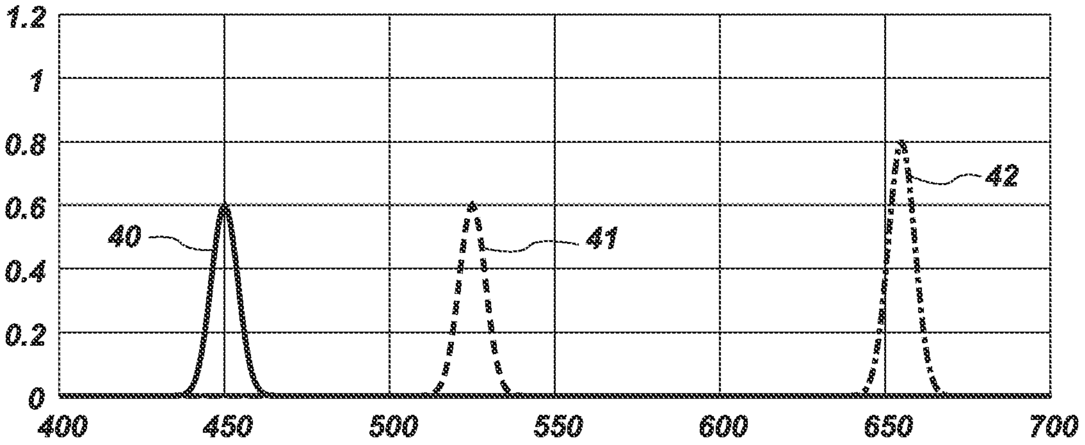
FIG. 2*a* is a graph of different vivid spectrums of wavelength blocks in accordance with one aspect of the technology.
Figure 2B:
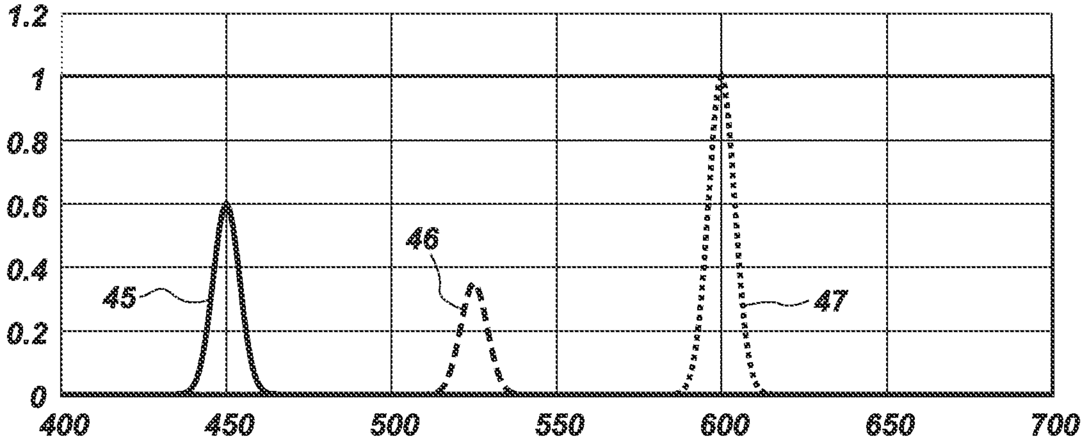
FIG. 2*b* is a graph of different dulling spectrums of wavelength blocks in accordance with one aspect of the technology used in conjunction with the vivid spectrum of FIG. 2*a;*

In the dulling spectrum disclosed in FIG. 2*b* comprises a plurality of wavelength segments comprising a first dulling wavelength segment or block 45 ranging from about 440-460 nm, a second dulling wavelength or block 46 ranging from about 510-540 nm, and a third dulling wavelength segment or block 47 ranging from about 590-610 nm. The relative intensity of the first 45, second 46, and third 47 dulling segments or blocks to one another are all different. Specifically, the intensity of the first dulling wavelength segment 45 is about 0.6 (or between about 0.55 and 0.65) of the intensity of the third dulling wavelength segment 47. The second dulling wavelength segment 46 is about 0.375 (or between about 0.3 and 0.4) of the intensity of the third dulling segment 47. As with the vivid spectrum, in one aspect of the technology, if the intensity of the light propagated from the dulling spectrum is increased or decreased, the relative ratio of the intensities of the different wavelength segments within the dulling spectrum remains the same.

Figure 3A:
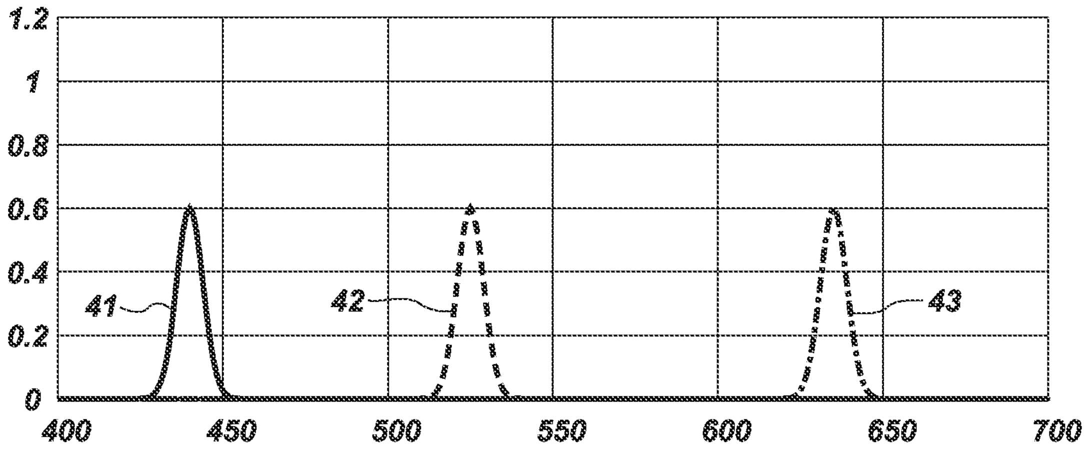
FIG. 3*a* is a graph of different vivid spectrums of wavelength blocks in accordance with one aspect of the technology.
Figure 3B:
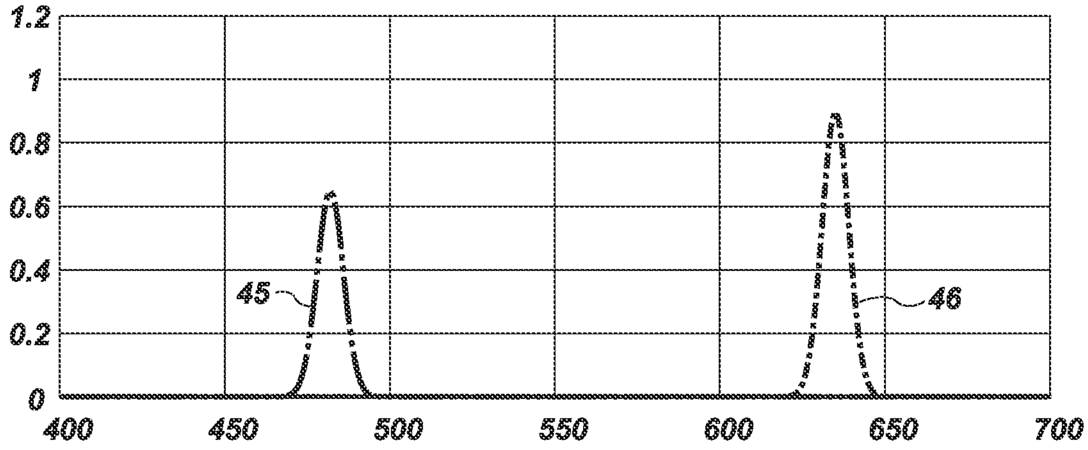
FIG. 3*b* is a graph of different dulling spectrums of wavelength blocks in accordance with one aspect of the technology used in conjunction with the vivid spectrum of FIG. 3*a;*

While specific wavelength ranges or segments are disclosed, it is understood that different wavelength segments (vivid and/or dulling) can be used so long as the wavelengths combine to have the appearance of a general white light wherein the vivid phase or vivid spectra is configured to emphasize a particular wavelength block associated with a target that has specific color absorption/reflection properties in view of the dulling phase or dulling spectra. For example, in another aspect of the technology, with reference to FIG. 3*a*, a plurality of wavelength segments of the vivid spectrum is shown comprising a first vivid wavelength segment 41 ranging from about 440-460 nm, a second vivid wavelength segment 42 ranging from about 510-540 nm, and a third vivid wavelength segment 43 ranging from about 630-650 nm. FIG. 3*a* also discloses the relative intensity of the different segments to one another. In this aspect, the relative intensity of the first, second, and third wavelength segments of the vivid spectrum are substantially the same. In accordance with one aspect of the technology, the dulling spectrum disclosed in FIG. 3*b* comprises a plurality of dulling wavelength segments comprising a first dulling wavelength segment 45 ranging from about 470-490 nm and a second dulling wavelength segment 46 ranging from about 630-650 nm. The relative intensity of the first dulling segment 45 to the second dulling segment 46 is about 0.67 (or between about 0.6 and 0.7). As with the vivid source or full spectrum, in one aspect of the technology, if the intensity of the light propagated from the dulling source or full spectrum is increased or decreased, the relative ratio of the intensities of the different wavelength segments or blocks in the entire dulling source or spectrum remains the same. Meaning, the intensity of all wavelength segments in the vivid source or spectrum may be increased or decreased by the end user, but the ratio of the intensity amongst the different wavelength segments remains the same. Likewise, the intensity of all wavelength segments in the dulling source or spectrum may be increased or decreased by the end user, but the ratio of the intensity amongst the different wavelength segments remains the same.

Figure 4A:
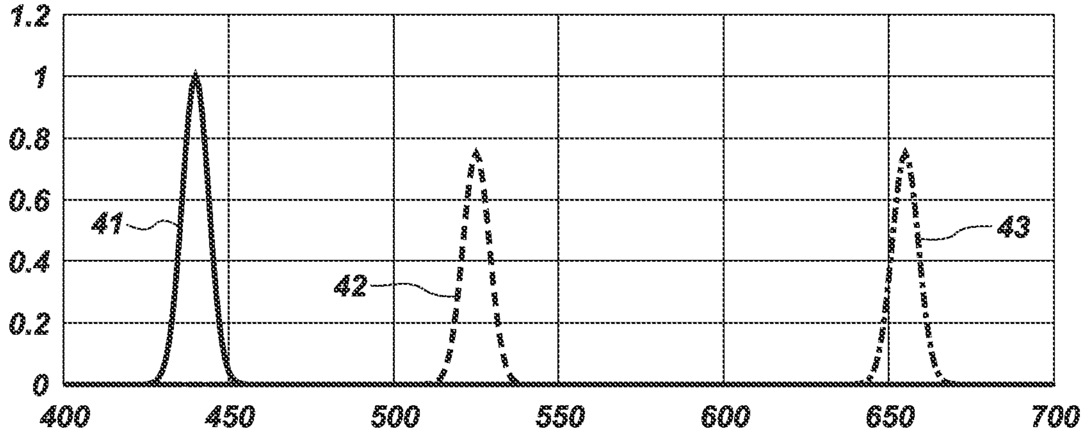
FIG. 4*a* is a graph of different vivid spectrums of wavelength blocks in accordance with one aspect of the technology.
Figure 4B:
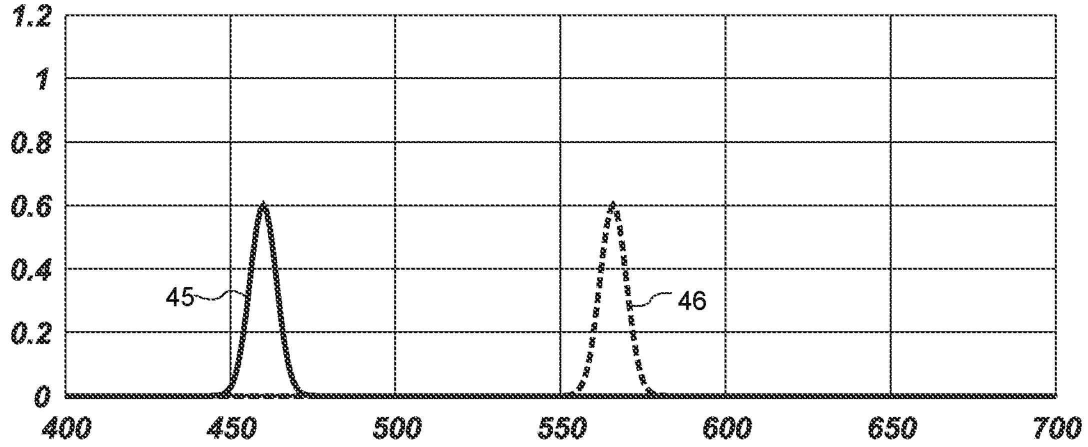
FIG. 4*b* is a graph of different dulling spectrums of wavelength blocks in accordance with one aspect of the technology used in conjunction with the vivid spectrum of FIG. 4*a;*

In one aspect of the technology, with reference to FIG. 4*a*, a plurality of wavelength segments of the vivid spectrum or vivid source is shown comprising a first vivid wavelength segment or block 41 ranging from about 430-450 nm, a second vivid wavelength segment or block 42 ranging from about 520-540 nm, and a third vivid wavelength segment or block 43 ranging from about 640-670 nm. FIG. 4*a* also discloses the relative intensity of the different wavelength segments to one another. In this aspect, the relative intensity of the second and third wavelength segments 42, 43 of the vivid spectrum are substantially the same and are about 0.75 (or between about 0.7 and 0.8) of the intensity of the first vivid wavelength segment 41. In accordance with one aspect of the technology, the dulling spectrum disclosed in FIG. 4*b* comprises a plurality of wavelength segments comprising a first dulling wavelength segment or block 45 ranging from about 450-470 nm and a second dulling wavelength segment or block 46 ranging from about 560-580 nm. The relative intensity of the first and second dulling wavelength segments 45, 46 is approximately the same.

Figure 5A:
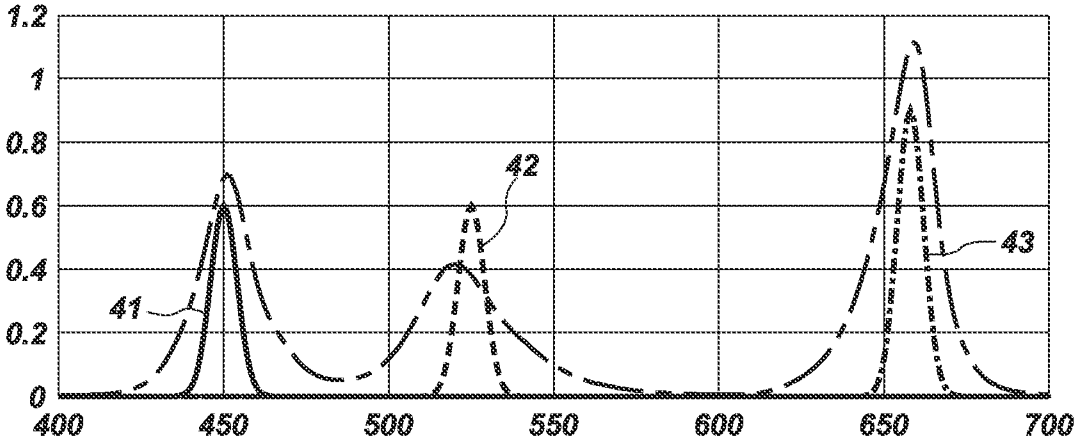
FIG. 5*a* is a graph of different vivid spectrums of wavelength blocks in accordance with one aspect of the technology.
Figure 5B:
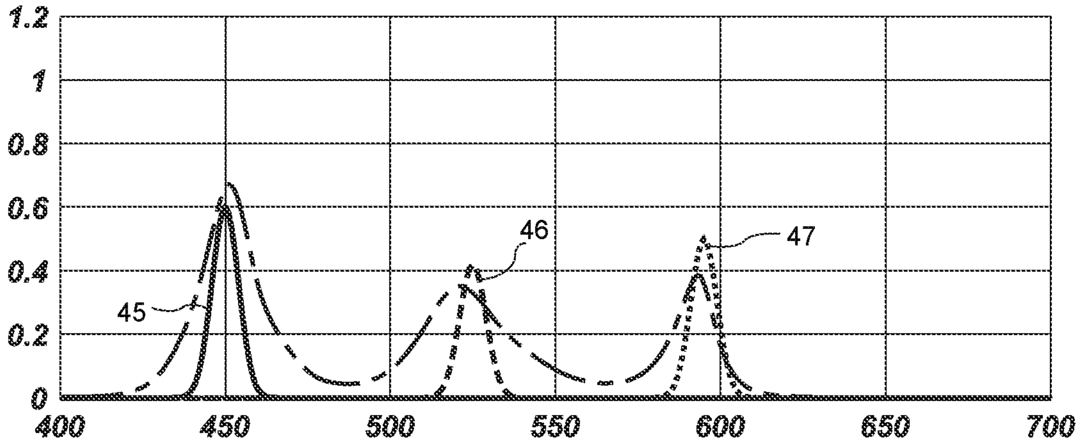
FIG. 5*b* is a graph of different dulling spectrums of wavelength blocks in accordance with one aspect of the technology used in conjunction with the vivid spectrum of FIG. 5*a.*

In one aspect of the technology, with reference to FIG. 5*a*, a plurality of wavelength segments of the vivid spectrum is shown comprising a first vivid wavelength segment 41 ranging from about 430-450 nm, a second vivid wavelength segment 42 ranging from about 520-540 nm, and a third vivid wavelength segment 43 ranging from about 650-670 nm. In this aspect, the relative intensity of the first and second wavelength segments 41, 42 of the vivid spectrum are substantially the same and are about 0.75 (or between about 0.7 and 0.8) of the intensity of the third vivid wavelength segment 43. In accordance with one aspect of the technology, the dulling spectrum disclosed in FIG. 5*b* comprises a plurality of wavelength segments comprising a first dulling wavelength segment or block 45 ranging from about 440-460 nm, a second dulling wavelength segment or block 46 ranging from about 560-580 nm, and a third dulling wavelength segment or block 47 ranging from about 580-605 nm. The intensity of the second dulling wavelength segment 46 to the first dulling wavelength segment 45 is approximately 0.67 (or between about 0.6 and 0.7). The intensity of the third dulling wavelength segment 47 to the first dulling wavelength segment 45 is approximately 0.83 (or between about 0.8 and 0.9).

In another aspect of the technology, a plurality of wavelength segments of the vivid spectrum comprises a first vivid wavelength segment or block ranging from about 450-480 nm, a second vivid wavelength segment or block ranging from about 490-560 nm, and a third vivid wavelength segment or block ranging from about 650-680 nm. In this aspect, the relative intensity of the first vivid wavelength segment to the second vivid wavelength segment of the vivid spectrum is about 0.75 (or between about 0.7 and 0.8). The ratio of intensity between the second vivid wavelength segment or block to the third vivid segment or block is about 0.3 (or between about 0.25 and 0.35). In accordance with one aspect of the technology, the dulling spectrum comprises a plurality of wavelength segments comprising a first dulling wavelength segment or block ranging from about 450-480 nm, a second dulling wavelength segment or block ranging from about 490-560 nm, and a third dulling wavelength segment or block ranging from about 580-610 nm. The intensity of the second dulling wavelength segment to the first dulling wavelength segment is approximately 0.67 (or between about 0.6 and 0.7). The intensity of the third dulling wavelength segment to the first dulling wavelength segment is approximately 0.83 (or between about 0.8 and 0.9).

In one aspect of the technology, the first vivid wavelength segment in the vivid phase is the substantially the same as the first dulling wavelength segment in the dulling phase. The intensity of the first wavelength segment of the vivid phase, however, is less than the intensity of the first wavelength segment of the dulling phase. That is, the intensity of the first vivid wavelength segment or block is less than the intensity of the first dulling wavelength segment or block. In another aspect, the second wavelength segment in the vivid phase is the substantially the same as the second wavelength segment in the dulling phase. The intensity of the second wavelength segment of the vivid phase is substantially the same as the intensity of the second wavelength segment of the dulling phase. The third wavelength segment in the vivid phase is targeted to emphasize a red colored target, the third wavelength segment in the dulling phase having a different wavelength segment but being similar to the third wavelength segment of the vivid phase. In one aspect, the intensity of third wavelength segment of the vivid phase is substantially higher than the intensity of the third wavelength segment of the dulling phase. In this manner, the red properties of the target are emphasized. While specific examples or provided, it is understood that different combinations and arrangements of dulling and vivid wavelength segments or blocks are within the scope of the technology so long as the target object is emphasized within the aggregated beam of light emanating from the lighting device 10.

It is believed that different end users have different visual acuity. As such, no single configuration of a vivid phase and dulling phase will be optimal for all end users. Moreover, no single duty cycle for a vivid phase and dulling phase or intensity level will be optimal for all end users. In accordance with aspects of the technology, the lighting device 10 is configured to allow the user to variably adjust the intensity of the dulling phase and/or vivid phase either through manipulation of the voltage or amperage being relayed to the vivid and/or dulling sources or an increase of the relative number of LEDs operating in any one particular source. In another aspect of the technology, the end user selects amongst a plurality of preset levels of vivid intensity and/or dulling intensity. The term intensity used herein refers to the amount of light (lumens) falling on a surface over any given square foot or square meter, for example. It can be measured in foot-candles, lumens, or lux. For reference, it is noted that 1 lux equals 1 lumen/m2.

In accordance with other aspects of the technology, the lighting device 10 is configured to allow the user to variably adjust the duty cycle of the vivid phase and/or dulling phase to optimize the visual acuity of the end user. In another aspect of the technology, the end user selects amongst a plurality of preset levels of vivid and/or dulling duty-cycles. In another aspect of the technology, the lighting device 10 is configured with a plurality of preset vivid/dulling spectra combinations that the user may select from. In this manner, more than one target may be viewed depending on the wavelength absorption/reflection characteristics. Likewise, again due to the different visual acuity of end users, a plurality of different vivid/dulling spectra combinations that are tuned to emphasize one object is contemplated. For example, in accordance with one aspect of the technology, a lighting device may have a "blood" setting and/or a "foliage" setting. In one aspect, the blood setting, for example, has a plurality of preset vivid and dulling wavelength segments that the user may select; the different presets configured to optimize the spectra of light associated with blood identification by the human eye within the normal visible spectrum of light (though UV wavelengths of light may also be used). Each of the wavelength segment presets may be modified to have a different duty cycle. Meaning, the vivid phase duty cycle may be adjusted up or down and the dulling phase duty cycle may be adjusted up or down. In addition, the intensity of light propagated from the vivid block and/or the dulling block may be adjusted up or down, constrained by maintenance of the intensity ratio between wavelength segments in the same block. In a "foliage" setting, duty cycles and intensity levels can likewise be adjusted up or down but the wavelength segments would be optimized to optimize spectra of light associated with foliage identification by the human eye within the normal visible spectrum of light (though infrared wavelengths of light could also be used).

In one aspect of the technology, the lights source 30 requires a driver in order to provide/deliver a desired output. The driver may be internally or externally incorporated into the light source 30 and can be either constant current or constant voltage. Both constant current and constant voltage drivers act as a power supply for the light source 30. Drivers provide and regulate the necessary voltage in order to maintain operation of the light source 30. In one aspect of the technology, a constant current driver operates within a range of output voltages and a fixed output current (amps). Light source 30 can have LEDs rated to operate at a forward voltage with an associated current, and a supply is needed to deliver the required operational voltage and current. In one aspect, a constant current driver varies the voltage along an electronic circuit which allows a constant electrical current through the light source 30. In one aspect of the technology, a constant voltage driver operates on a single direct current (DC) output voltage (e.g., 12 VDC or 24 VDC, etc.). The driver will maintain a constant voltage no matter the load current. In one aspect of the technology, the power mode of the lighting device may be changed by changing the current that is available from the light source drive circuitry. In one aspect of the technology, an electronic circuit comprises an overall voltage supply that is high enough to span a number of LEDs in series (e.g., 3.2V is a forward voltage rating for different LEDs, etc.), and a 10 Ohm resistor component is used to set the desired current. By varying the resistor, brightness of the LEDs is varied up to the forward current limitation of the light source 30. Of course, different forward voltage ratings and different resistors, or other circuit components, may be used as a means of regulating constant current in a light source 30.

In one aspect of the technology, a lighting unit comprises one or more electric light sources alternately operating in two modes, producing light of two different spectral makeups. One or more electric light sources are activated in each spectral mode or phase, with the total spectral outputs of the two modes arranged to meet two criteria. In one aspect, the first of these criteria is to have the two spectral makeups appear somewhat similar to the eye of an observer. The second of these criteria is to have at least one of the two spectral makeups be deficient in some chosen portion of the visible spectrum. As the illuminated area is alternately bathed with light of the two spectral makeups, target items with a high reflectivity characteristic in said chosen portion of the spectrum typically show a flashing effect, while white and neutral-colored parts of the target area typically show relatively constant appearance. When "flashed" fast enough, the human eye perceives the light as a constant beam of propagated light but certain aspects of the target are more prominent because the target is "vivified", the non-target aspect are "dulled" or both happen at the same time. Meaning a target can be vivified or the non-target can be dulled, which results in an enhancement of the target, or the target can be vivified and the non-target area dulled at the same time.

Aspects that aid people with color blindness may likewise operate in two modes, again with the total spectral outputs of the two modes arranged to meet two criteria. In this case, the first of these criteria is to have the two spectral makeups appear somewhat similar to the eye of the user with color-blindness, if not necessarily as viewed by a person with normal color vision. And in this case, the second of these criteria is still to have at least one of the two spectral makeups be deficient in some chosen portion of the visible spectrum, although it may now become desirable to have each of the two spectral modes exhibit some spectral deficiency, rather than just one of them. Another aspect of the technology aids in the detection of other specific wavelengths when ambient light, lack of contrasting background, distance, or otherwise limited visibility may benefit from enhanced contrast. Signal markers, for example, such as marine buoys, can be a specific color, and the alternating spectrum can be used to intermittently highlight these against their surroundings.

The detection of UV-sensitive, "glow in the dark" (fluorescent) items can also benefit from aspects this technology. UV dyes are used in the detection of leaks in a variety of fluid systems such as automobile lubrication, HVAC, and other pressurized systems where small leaks can be difficult to identify. Proper identification of these dyes often involves a UV light source, combined with filtering glasses, and a reduced brightness environment for easy detection. Similarly, detection of some insects, such as scorpions, requires similar UV sources and low ambient lighting conditions. Using spectrum that are designed to alternately cause these items to fluoresce and appear dull can aid immensely in detection on a variety of surfaces, with no additional tools or aids, and in greater ambient light conditions.

A lighting unit comprising a control system feeding electrical power to multiple light sources provides enhanced visibility of certain colors in a target area by switching between multiple spectral modes, effectively making a colored target of interest flash in intensity. Although the number of spectral modes supported may be more than two in some aspects, one case provides only two such modes, which may be called a "dulling mode" and a "vivifying mode." Advantageously, aspects of the present technology improve the detectability of the flashing target by achieving minimization of the amount of distractive flashing visible in the illuminated field. This minimization of the distracting effect of flashing in the illuminated field is accomplished through tailoring the spectrum produced in the dulling mode to produce a light that looks, to the human eye, quite similar in coloration to the vivifying mode spectrum, while being deficient in the specific light wavelengths that would be needed to make the target color shine brightly. Further minimization of the distracting effect of flashing in the illuminated field may be accomplished by making the light output, (measured in lumens, for example), in the dulling mode, closely equivalent to that of the vivifying mode. Colorless white or gray objects in the illuminated area, in particular, may show very little variation in color or brightness, thereby giving the flashing targeted object improved prominence. The perceived human-eye direct-viewed color produced by the two modes may be, for example, a shade of orange, yellow, white, or tinted white.

Figure 6:
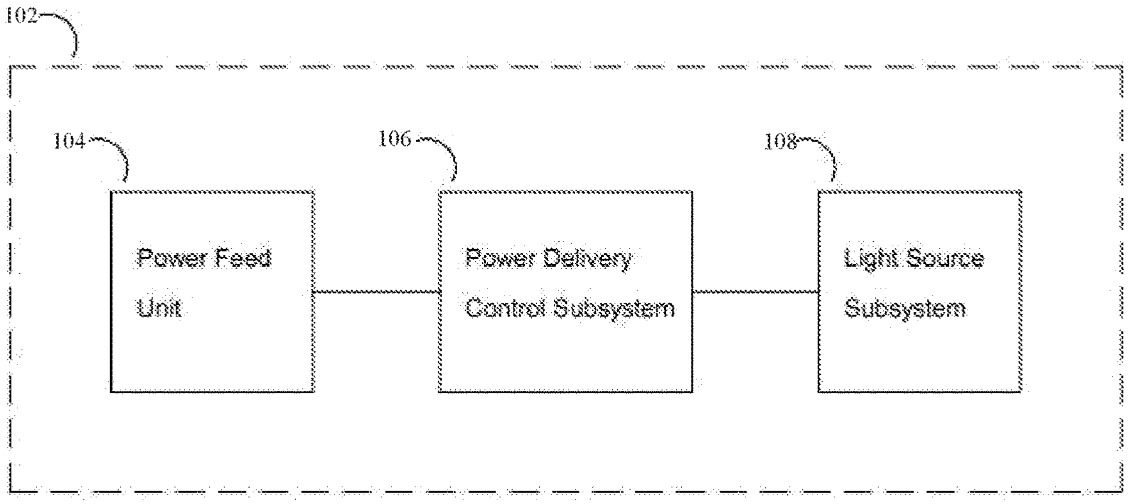
FIG. 6 is a block diagram showing aspects of the technology.

Referring now to FIG. 6, a block diagram of a color-revealing lamp in accordance with principles of the invention is illustrated. The light source 102 includes a power feed unit 104, a power delivery control subsystem 106, and light source subsystem 108. Each of these parts may vary in complexity; for example, the power feed unit may be a connector for attaching a remote power source, or it may comprise a local battery, or it may comprise a regulated power supply as suits different aspects.

Figure 7:
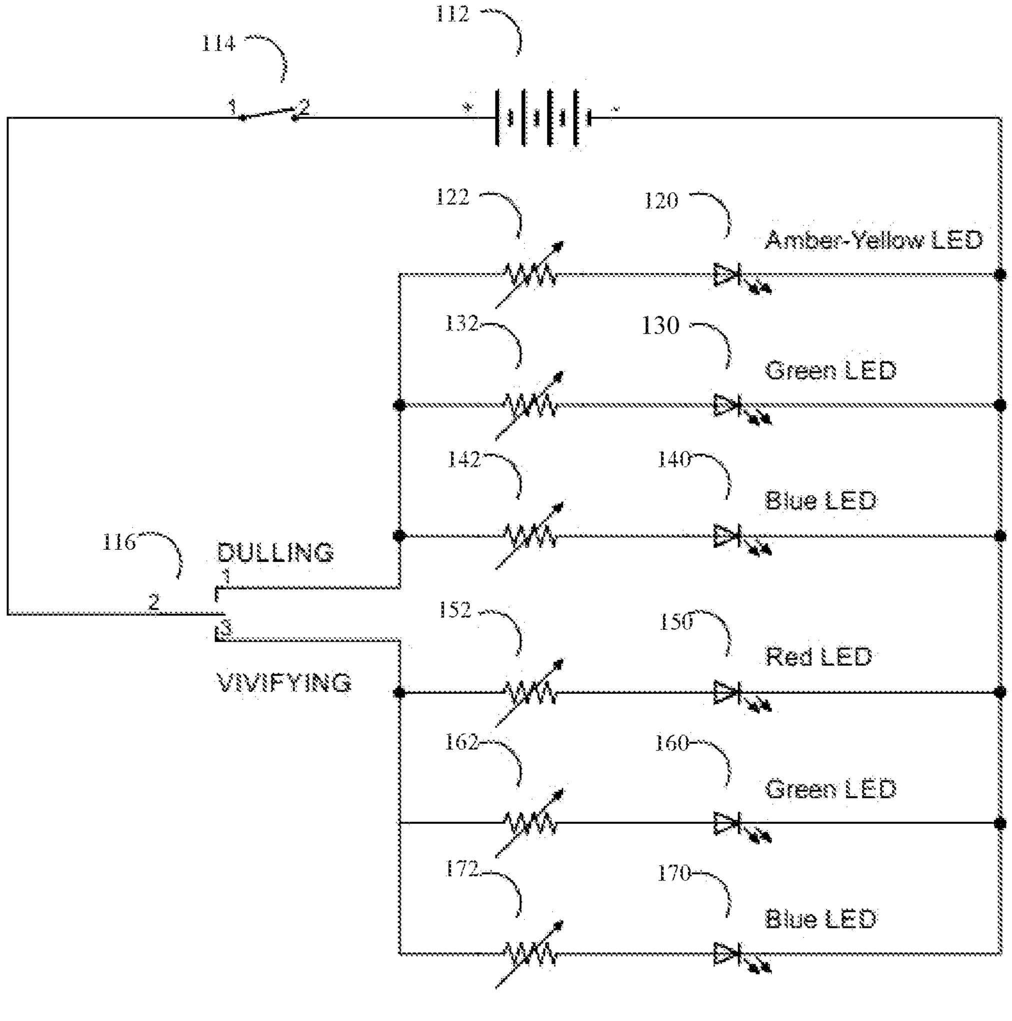
FIG. 7 is an electrical schematic in accordance with one aspect of the technology.

Referring now to FIG. 7, a schematic diagram of a one aspect of the light of FIG. 6., battery 112 corresponds to the power feed unit block 104 of FIG. 6. A component group comprising power switch 114 and mode switch 116 and rheostats 122, 132, 142, 152, 162, and 172 corresponds to the power delivery control subsystem 106 of FIG. 6. A rheostat is a resistor of adjustable resistance, which may either be made controllable by a user during operation, or adjusted during the build process and thereafter left unaltered. Other resistors may also be used herein. A component group comprising red LED 150 and green LED 160 and blue LED 170, which comprise a "vivifying LED section" is active in a vivifying mode. Selection of the specific resistance values of rheostats 152, 162, and 172, the "vivifying mode current-setting rheostats" will determine the color tint and brightness of light produced in the vivifying mode. A component group comprising amber-yellow LED 120 and green LED 130 and blue LED 140, which comprises the "dulling LED section," is active in dulling mode. Selection of the specific resistance values of rheostats 122, 132, and 142, the dulling current-setting mode Rheostats will determine the color tint and brightness of light produced in the dulling mode.

All of the LED's together correspond to the light source subsystem 108 of FIG. 6. The resistance of the six rheostats, measured in units of Ohms, is configured to meet the design goals of producing a desired color, such as a tint of white or yellow, on direct viewing by the human eye, with minimal perceptible color change between the vivifying mode and dulling mode. In one aspect, a rheostat choice strategy would start with choosing values of the vivifying mode current-setting rheostats to produce a desired brightness and shade of white from the combined output of the vivifying LED section. Continuing this strategy would involve setting rheostat 122 which controls the brightness of the amber-yellow LED. The amber-yellow LED produces light of a peak wavelength between that of the red and green LEDs, but as perceived when directly viewed by the human eye, its effect is similar to a mix of light from red and green LEDs. In one aspect, the rheostat 122 controlling the brightness of the amber-yellow LED is so that as seen by the eye, the amber-yellow LED replaces all the red light produced by the vivifying LED section's red LED, plus part of the green light from vivifying LED section's green LED. The rheostat 132 controlling the brightness of the green LED of the dulling LED section would then be chosen to have said green LED make-up the remainder of the green light from vivifying LED section's green LED. Then the rheostat 142 controlling the brightness of the dulling LED section's blue LED 140 would be adjusted for minimal visible change between the two modes.

Figure 8:
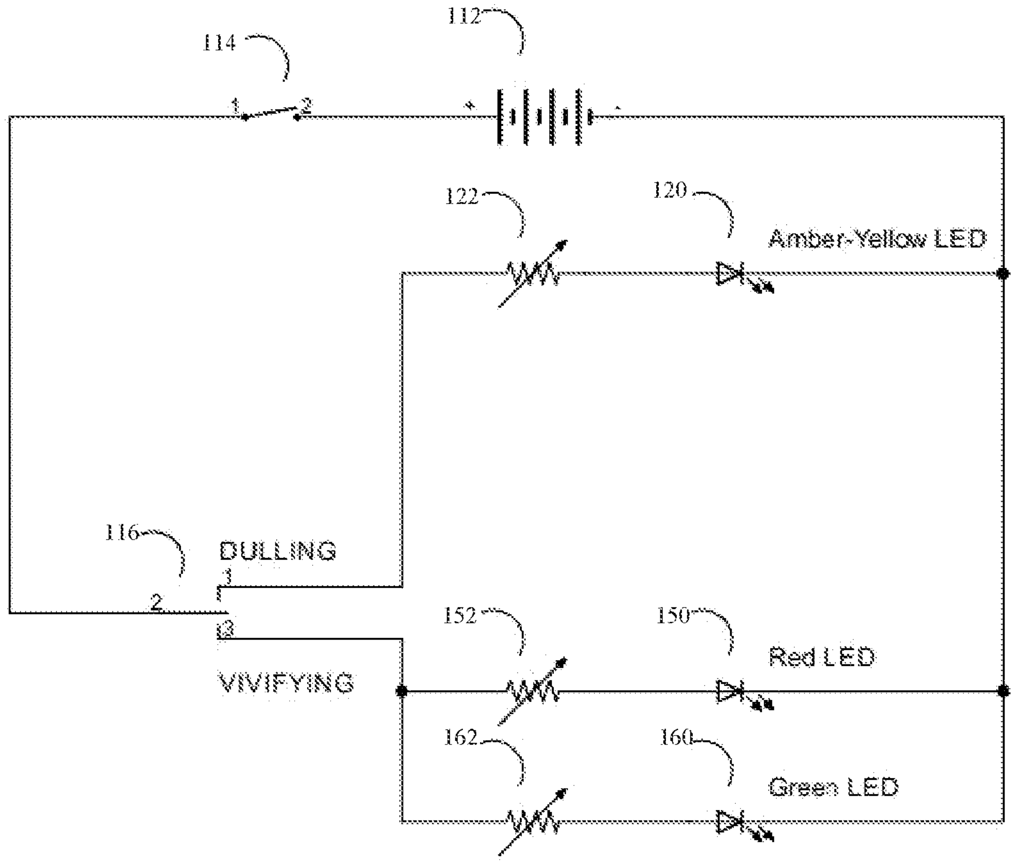
FIG. 8 is an electrical schematic in accordance with one aspect of the technology.
Figure 9:
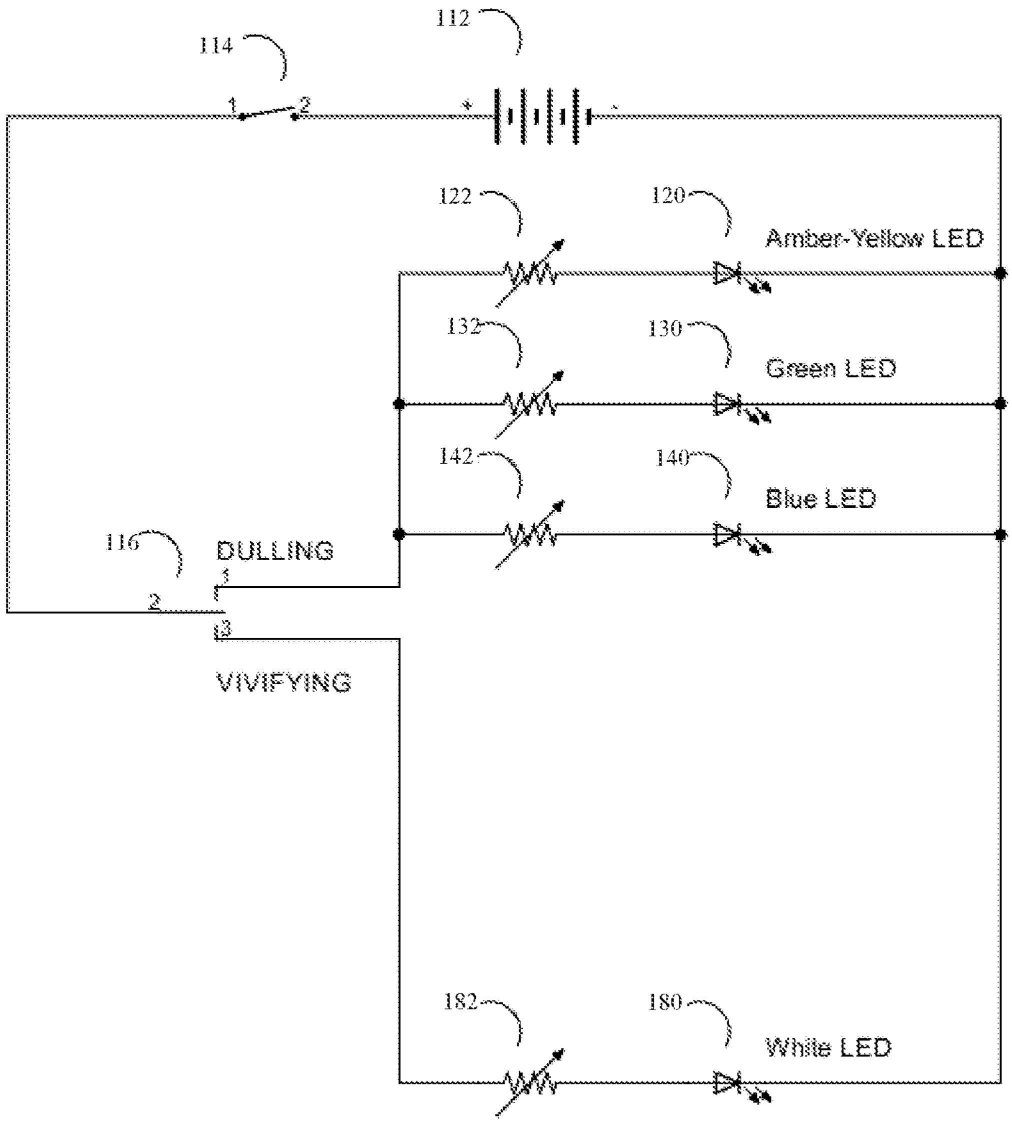
FIG. 9 is an electrical schematic in accordance with one aspect of the technology.

The schematic diagram of FIG. 7 illustrates an aspect containing an implementation of a power delivery control subsystem. In one aspect, the operator is expected to continuously operate the mode switch to bring about the desired flashing effect on targets in the target area. The FIG. 7 schematic diagram comprises only one aspect of the present technology in general comprising multiple LED light sources for the vivifying light source section and also for the dulling light source section. Other aspects of the technology comprise a single light source, which may be one single LED on its own and is operable as two light source sections. FIGS. 8 and 9 each illustrate examples of such an aspect. Referring now to FIG. 8, a schematic diagram of an additional aspect of a light of FIG. 6 is illustrated. Elements in this figure are carried over from FIG. 7, except that both of the blue LEDs 140 and 170, and also the green LED 130 of the dulling light source section, along with their associated resistors or rheostats 142, 172, and 132, have been removed. In this aspect, the resistor or rheostat choice strategy would involve choosing the resistance value of rheostat 122 to produce a suitable dulling mode brightness from the amber-Yellow LED 120, and choosing the resistance values of resistors or rheostats 152 and 162 to make LEDs 150 and 160 combine to match the amber-yellow LED 120 brightness level and coloration. Whether this form provides acceptable performance would be subject to user testing; the shade of light produced by the single amber-yellow LED 120 may not be what some users desire.

Referring now to FIG. 9, a schematic diagram of an additional embodiment of the color-revealing lamp of FIG. 6 is illustrated. All the elements in this figure are carried over from FIG. 7, except that LEDs 150 and 160 and 170 have been removed, along with their associated current-setting resistors, 152, 162, and 172, and a new white LED 180 has been added, along with a new current-setting rheostat 182. In this aspect of the technology, the resistor choice strategy would involve choosing the resistance value of the resistor or rheostat 182 to produce a suitable vivifying mode brightness from the white LED 180, and adjusting resistors or rheostats 122 and 132 and 142 to make LEDs 120 and 130 and 140 combine to match the brightness level and coloration of white LED 180. Whether this form provides acceptable performance would be subject to user testing.

Figure 10:
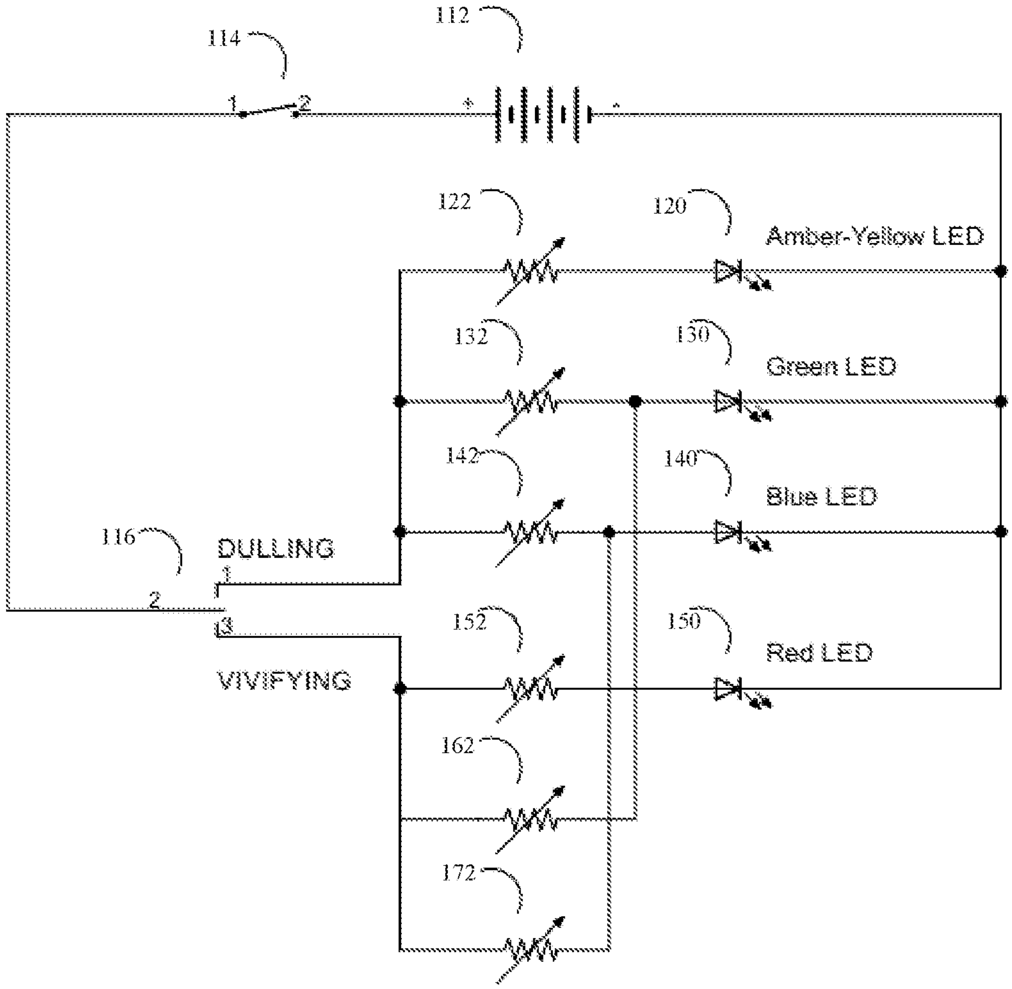
FIG. 10 is an electrical schematic in accordance with one aspect of the technology.

Referring now to FIG. 10, a schematic diagram of an additional aspect of the technology of FIG. 6 is illustrated. This aspect reduces the number of LEDs to four without resorting to making the total light color non-white as in FIG. 8 or using a white LED as in FIG. 9. It achieves this reduction by having one blue and one green LED shared between the vivifying and dulling LED sections. In this schematic, each of the LEDs 130 and 140 are fed current through either of a pair of current-setting rheostats. Of the six resistors or rheostats, there are three 112, 132, and 142 which selectively feed current to the LEDs in dulling mode, and there are three 162, 172, and 152 which selectively feed current to the LEDs in vivifying mode.

In FIG. 10, a single blue LED takes over the function of both of the blue LEDs of FIG. 7, and a single green LED takes over the function of both of the green LEDs of FIG. 7. Because in dulling mode, the amber-yellow LED provides the equivalent of some amount of green light, typically, the green LED will be set up to be fed less power in dulling mode than in vivifying mode, by using a resistor or rheostat 132 with a higher resistance value than resistor or rheostat 162. In another aspect, each of the six resistors or rheostats might be adjusted or designed to match its equivalent-numbered resistor or rheostat from FIG. 7.

Use of rheostats are described herein, but it is anticipated that a different resistor may be used. In other aspects of the technology a microprocessor is used in addition to, or instead of rheostats, to limit or control the flow of electric current to the light source.

Aspects of the technology have a common component that is a source of light with a wavelength that places it between that of a pure red and pure green. Specifically, this has been described as an amber-yellow LED. Advantageously, the action of providing light that the eye of a person with normal color vision sees as very similar to a mix of red light wavelengths and green light wavelengths, but which actually contains rather low levels of these; it is what makes the dulling mode "dulling. In this aspect, which provides a somewhat normal white or yellow light in vivifying mode, and a similar-looking but red-deficient light in dulling mode, will be referred to as a "red-dulling aspect." An anticipated use of such an aspect may be as a hunter's blood tracking flashlight. Aspects for other uses may have a different essential wavelength in their dulling spectrum.

In a theatrical or entertainment field of application, there may be a desire for a spotlight that makes red dresses flash, and one that makes deep-blue dresses flash. For the red-dress flasher, a red-dulling aspect previously described may suffice, if scaled up to project a beam larger than a hand-held flashlight. Likewise, to make blue targets flash, the spotlight's dulling would comprise the ability to be dulling to deep blues. This aspect comprises use of a light source that emits or propagates a wavelength in or near the 480 to 510 nanometer range, which, falling between the deep blues and pure greens, will look to the human eye as very similar to a mix of blue light wavelengths and green light wavelengths.

Adding a pure red-light source then creates the desired white-looking but with blue-dulling illumination.

While previous aspects comprise making the dulling and vivifying mode light outputs look closely matched when directly viewed by the human eye, there may be cases where a result other than a perfect match may be selected in the process of setting the individual light source levels. For example, in a theatrical application, there may be a desire, instead of making the two modes match when viewed shining on a white background in the illuminated field, to have them match when view shining on a light pink, light yellow, or other background color. User-adjusted individual LED controls make this possible. And, making the vivifying mode light output slightly redder than the dulling mode may be preferred by some users.

The amber-yellow LEDs referred to herein may have an emitted or propagated light wavelength of approximately 590 to 605 nanometers. In general, it is expected that a 590 to 605 nanometer source will be useful in making a good white-appearing light that provides dulling to reds, and a 480 to 510 nanometer source will be useful in making a good white that provides dulling to deep blues. Dulling, and therefore flashing, of green wavelengths may also be seen to some extent with all of the devices described. If it is desired to have a dulling mode that maximizes the dulling of greens, to produce a stronger effect of flashing of greens, it may be advantageous to use a dulling spectrum made from light sources of, for example, around 495 nanometers, and around 600 nanometers, and little or nothing else. Such a combination may produce a white light that provides good dulling for greens, but also for reds and blues.

All the aforementioned values of spectral wavelength given as numbers of nanometers are approximations. There are multiple ways of specifying wavelengths used by LED manufacturers. Commonly used are the terms "dominant" wavelength and "peak" wavelength, which can be different for the same LED.

Aspects of the technology may vary from those shown in the figures in many ways. For example, in one aspect each individual LED in the schematics is replaced with a bank of multiple LEDs to provide required brightness levels, or other light sources of suitable characteristics are substituted for LEDs in general. In certain aspects, optical filters, such as gel sheets or dichroic filters are used in the light path from one of more of the electric light sources. In certain aspects of the technology, active circuitry such as switching converters or switching current regulators are used instead of rheostats for setting the brightness of the light sources. Techniques such as PWM are also used in aspects of the technology.

Aspects of the technology are expected to comprise a device that does the switching between dulling and vivifying modes automatically, instead of having the user operating a switch. In one aspect, such a device comprises a variable flash rate, and/or allow for a user-variable duty cycle, meaning, the duration of the dulling and vivifying intervals would be unequal, according to user preferences. In other aspects, microprocessor control is implemented to support these functions, and also includes wireless control and integration with a smart phone or other remote control device. This may be done through a control App or other user interface, such as control knobs or a control panel, the tuning of individual LED brightness levels, and consequently, exact color shades of the dulling and vivifying light output may be placed under user control.

Focusing, diffusing, or other lenses or reflectors are used in other aspects of the technology. If desired for specific applications, additional lighting modes are added beyond the dulling and vivifying modes. In one aspect, the lighting device is optimized for hand-held or fixed-appliance use.

In one aspect of the technology, it is desirable to add a fixed safety resistor inserted in series with each of the rheostats, to prevent an over-current condition if the user turns the rheostat control knob to maximum. LEDs that may be selected include, but are not limited to, types XPEBPR Red, XPEBGR Green, XPEBBL Blue, and XPEBAM Amber from Cree LED, Durham, NC. The XPEBPR Red LED model, for example, may provide extra vivifying effect compared with typical red LEDs, by providing a lower wavelength of red; 660 nanometers as opposed to 630. Using these LEDs, with a proper heatsink arrangement, current drive up to 1 Ampere may be used; if a 12 Volt battery is used, ten Ohms are used for safety resistors, and 50 Ohms for each rheostat.

In some aspects of the technology, discussions regarding lights vivifying or dulling different spectra contemplate a user and observer of normal vision. However, individuals with some forms of color-blindness or other vision problems may find usefulness in a "red-dulling" aspect built on an elaboration of the design of FIG. 7. However, some of these users may find limited value in such lights as while the light source makes red things appear for them, it may make some green things appear in unison with the red ones. This may be of little use if red and green look about the same color. A person with severe color-blindness might prefer red and green things to appear in alternation, rather than in unison, and is an operational aspect contemplated herein.

Figure 11:
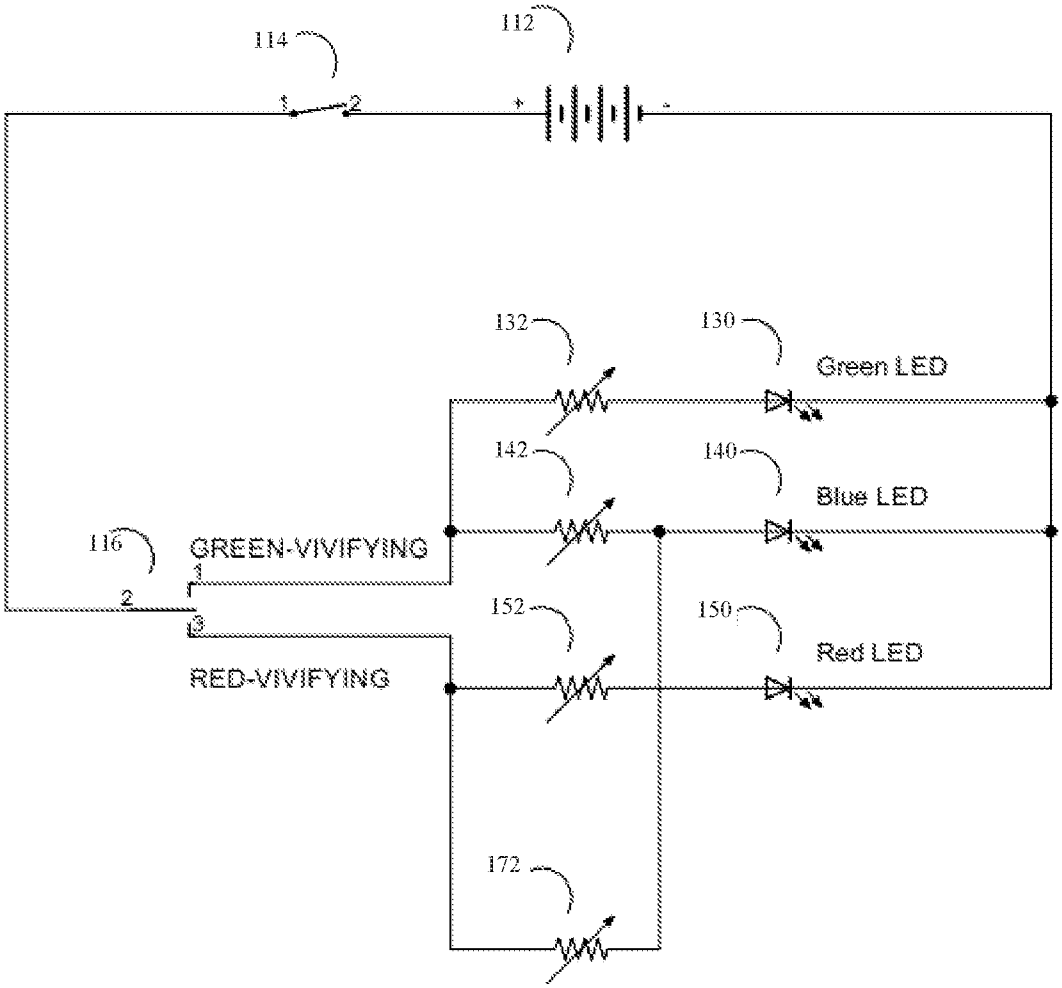
FIG. 11 is an electrical schematic in accordance with one aspect of the technology.

Referring now to FIG. 11, a schematic diagram of an additional embodiment of the color-revealing lamp of FIG. 6 is illustrated. In this embodiment, a lamp with two vivifying modes has been created by taking FIG. 10., removing the amber-yellow LED, and additionally removing rheostats (or resistors) 122 and 162 so that one mode has only blue and green LEDs powered, and the other mode has only blue and red LEDs powered. This makes a light that switches between two modes which may be called a green-vivifying mode and a red-vivifying mode. To a viewer with normal vision, the light produced may look like cyan or blueish-green in the green-vivifying mode, and magenta in the red-vivifying mode.

By manipulating rheostat (or resistor) 152 and rheostat (or resistor) 142 to set the individual brightness levels of the red LED and blue LED in red-vivifying mode, and rheostat (or resistor) 132 and rheostat (or resistor) 172 to set the individual brightness levels of the green LED and the blue LED in the green-vivifying mode, a person with complete red-green color blindness may be able to set up the lamp so that, to him or her, the light produced in the two modes makes red and green objects flash in opposition (i.e., alternately) while white and gray objects in the illuminated field show little or no variation. This provides a vivifying mode that brightens reds, and a vivifying mode that brightens greens. The two vivifying modes taken together are referred to herein as a "discriminative pair."

In another aspect of the technology, a light that produces a discriminative pair, how to control the switching between the two modes, is subject to variation. In the case illustrated in FIG. 6, the user operates the switch as desired. Another aspect features adjustable flash rate and adjustable "flash ratio", under control of a microprocessor. In this aspect, "flash ratio" is the adjustable relative length of the red- and green-vivifying modes. For example, the user might set the system to alternate 0.15 seconds of red-vivifying mode with 0.35 seconds of green-vivifying mode, repeating every 0.5 seconds. This would cause red objects in the illuminated field to be seen to give a short bright interval, and green objects to give a short dark interval, each twice per second. A versatile control system might also support more complicated cycles that some users might prefer. For example, one user might prefer a repeating cycle of 0.25 seconds green-vivifying, 0.1 seconds red-vivifying, and 0.5 seconds white.

In aspects of the technology, a lighting device seeks to provide a person with extreme red-green color blindness, color recognition abilities similar to those of a person with normal color vision. One aspect has a feature of full user control over individual light source brightness for accommodating different users. In particular, a user diagnosed with protanopia, for example, might be expected to set up the red and green LEDs to different levels than one with deuteranopia, if both desire a constant light that looks to them like white light, when shining on white or colorless objects. In general, protanopia and deuteranopia may be considered forms of severe red-green color blindness. More than two configurable color modes are contemplated herein as suits a particular need.

A method of aiding the visual detection of colored target objects or features by repeatedly bathing a visual field in a sequence of a plurality of differing illuminations is contemplated. The plurality of differing illuminations comprises at least a dulling illumination and a vivifying illumination, said dulling illumination and vivifying illumination having similar color tone or shade of white as viewed directly by a human observer, but having differing spectral makeups. In one aspect, the spectral makeup of the dulling illumination is deficient or lacking in a predetermined range of wavelengths. For example, on one aspect, the spectral makeup of the dulling illumination is deficient or lacking in a range of wavelengths corresponding to high-reflectivity wavelengths of said target objects.

While the methods described herein are not limited to any specific aspect of the technology described herein, in one aspect, a lighting device used to accomplish one of the methods described comprises a lighting device with a plurality of light sources and a control system configured to selectively provide power to the light sources. The plurality of light sources and said control system are configured to switch between a plurality of illumination modes, each one of said plurality of illumination modes being configured to propagate light comprising a spectral characteristic having a level of brightness. Each of said spectral modes is created by the control system directing electric power to an individual single member of, or a subset of, said light sources. Among the set of said illumination modes is included one dulling illumination mode, having the effect of providing a diminishment (or decrease in brightness) or darkening of the appearance of some color or range of colors in said target or scene. The diminishment or darkening is accomplished through a deficiency or lack of a portion or portions of the spectrum that would produce a more vivid, brighter, or lighter appearance of said color or range of colors. Among the set of said illumination modes is included one vivifying illumination mode, having the effect of providing a level of vividness to said color, or range of colors, that is substantially greater than that provided by said dulling illumination mode, said dulling illumination and vivifying illumination having similar color tone or shade of white as viewed directly by a human observer, while having differing spectral makeups.

In another aspect, the lighting device comprises a plurality of light sources and a control system configured to selectively provide power to the light sources. The plurality of light sources and said control system are configured to switch between a plurality of illumination modes, each one of the plurality of illumination modes being configured to propagate light comprising a spectral characteristic having a level of brightness. Each of said spectral modes is created by the control system directing electric power to an individual single member of, or a subset of, said light sources. Among the set of said illumination modes is included at least a pair of two illumination modes, said pair providing useful discriminative visual cues for a person who has color blindness through the differences in their spectral makeups while also providing illumination showing similarity of color tone or shade of white as perceived by a human observer who has color blindness.

It is noted that no specific order is required in any of the operational methods unless required by the claims set forth herein, though generally in some aspects of the technology, the method steps can be carried out sequentially. In one aspect, a method of operating a light source comprises activating a vivid light source disposed about a head of the device and concurrently propagating a plurality of vivid wavelength segments away from the head of the device, the vivid light source having a duty cycle less than 100%. It also comprises activating a dulling light disposed about a head of the device and concurrently propagating a plurality of dulling wavelength segments away from the head of the device at a time interval different from the vivid light source such that the dulling light and the vivid light do not overlap, the dulling light source having a duty cycle less than 100%. At least one of the plurality of vivid wavelength segments is configured to target an object characterized by the ability of that object to reflect at least one of the plurality of vivid wavelength segments. In one aspect, none of the plurality of dulling wavelength segments are configured to target the object characterized by the ability to reflect at least one of the plurality of vivid wavelength segments.

In one aspect of the technology, the method further comprises adjusting the duty cycle of the vivid light source up or down while maintaining a ratio of intensity between each of the plurality of vivid wavelength segments. It also comprises adjusting the duty cycle of the dulling light source up or down while maintaining a ratio of intensity between each of the plurality of dulling wavelength segments. In another aspect, the method comprises adjusting the intensity of the vivid light source up or down while maintaining a ratio of intensity between each of the plurality of vivid wavelength segments. Likewise, the method further comprises adjusting the intensity of the dulling light source up or down while maintaining a ratio of intensity between each of the plurality of dulling wavelength segments. In another aspect, the method further comprises adjusting the length of the first time interval and the second time interval, or adjusting the length of the first time interval or the length of the second time interval.

The foregoing description describes the technology with reference to exemplary aspects. However, various modifications and changes can be made without departing from the scope of the present technology as set forth in the appended claims. The detailed description and accompanying drawing are to be regarded as merely illustrative, rather than as restrictive, and all such modifications or changes, if any, are intended to fall within the scope of the present technology as described and set forth herein.

More specifically, while illustrative exemplary aspects of the technology have been described herein, the present technology is not limited to these aspects, but includes any and all aspects having modifications, omissions, combinations (e.g., of aspects across various aspects), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus-function are expressly recited in the description herein. Accordingly, the scope of the invention should be determined solely by the appended claims and their legal equivalents, rather than by the descriptions and examples given above.

The invention claimed is:

1. A method of operating a lighting device, comprising:

providing power to a light source comprising at least two modes of operation, each mode of operation comprising propagating a beam of light having different spectral characteristics than the other mode, wherein when the two modes are operated, the total spectral output enhances a visual characteristic of a target within an area surrounding the target;

a first mode of the at least two modes comprising a dulling mode;

a second mode of the at least two modes comprising a vivifying mode;

wherein the target comprises a reflective surface having level of reflectivity and wherein the area surrounding the target comprises a reflective surface having a second level of reflectivity; and wherein the dulling mode comprises propagating a wavelength of light at a first duty cycle and the vivifying mode comprises propagating light at a second duty cycle, the first duty cycle being greater than the second duty cycle.

2. The method of claim 1, wherein the vivifying mode comprises a wavelength of light that reflects from the target at a rate greater than it reflects from the area surrounding the target.

3. The method of claim 1, wherein the dulling mode comprises a wavelength of light that reflects from the target at a rate less than it reflects from the area surrounding the target.

4. The method of claim 1, wherein the lighting device comprises a plurality of LEDs and/or a COB.

5. A lighting device, comprising:

a plurality of light sources;

a control system configured to selectively provide power to the light sources, wherein the plurality of light sources and said control system are configured to switch between a plurality of spectral modes, each one of the plurality spectral modes configured to propagate light comprising a spectral characteristic having a level of brightness;

wherein the plurality of spectral modes comprises a discriminative pair of spectral modes providing contrasting color spectra which, when propagated on a target, enables color discernment of the target from a surrounding area;

wherein a first of the plurality of light sources corresponds to a first of the discriminative pair of spectral modes, and a second of the plurality of light sources corresponds to a second of the discriminative pair of spectral modes;

wherein the lighting device comprises a control circuit configured to regulate power provided to the first and second light sources;

wherein a first of the plurality of light sources comprises a (i) plurality of LEDs, each LED configured to propagate a different wavelength of light from the other LEDs and/or (ii) a COB having a plurality of LEDs disposed thereon;

wherein the discriminative pair of spectral modes comprises a dulling mode and a vivifying mode; and wherein the dulling mode comprises propagating light solely from an amber-yellow LED and the vivifying mode comprises propagating light simultaneously from a red LED and green LED.

6. The lighting device of claim 5, wherein the control system comprises a control circuit having at least one resistor coupled to each LED.

7. The lighting device of claim 5, wherein the control system comprises a programmable logic controller.

8. The lighting device of claim 5, wherein the control system comprises a programmable control configured to regulate power propagated to the LEDs.

9. The lighting device of claim 5, wherein the dulling mode and the vivifying mode comprise a plurality of light combinations that are selectively activatable by a user.

10. The lighting device of claim 5, wherein the dulling mode and vivifying mode comprise a preselected plurality of duty-cycle combinations that are selectively activatable by a user.

11. The lighting device of claim 5, wherein the dulling mode and vivifying mode comprise a preselected plurality of light intensity level combinations that are selectively activatable by a user.

12. A method of aiding the visual detection of colored target objects or features by repeatedly bathing a visual field in a sequence of a plurality of differing illuminations, wherein said plurality of differing illuminations comprises at least a dulling illumination and a vivifying illumination, said dulling illumination and vivifying illumination having similar color tone as viewed directly by a human observer, but having differing spectral makeups;

wherein the spectral makeup of the dulling illumination lacks a portion of a predetermined range of wavelengths, said predetermined range of wavelengths corresponding to high-reflectivity wavelengths of said target objects.

13. The method of claim 12, wherein the lighting device comprises a plurality of LEDs and/or a COB.

14. A lighting device, comprising:

a plurality of light sources; and a control system configured to selectively provide power to the light sources, wherein the plurality of light sources and said control system are configured to switch between a plurality of illumination modes, each one of the plurality of illumination modes being configured to propagate light comprising a spectral characteristic having a level of brightness;

wherein each of said spectral modes is created by the control system directing electric power to an individual single member of, or a subset of, said light sources;

wherein among the set of said illumination modes is included at least a pair of two illumination modes, said pair providing discriminative visual cues for a person who has color blindness through the differences in their spectral makeups while also providing illumination showing similarity of color tone as perceived by a human observer who has color blindness.

15. A method of operating a lighting device, comprising:

providing power to a light source comprising at least two modes of operation, each mode of operation comprising propagating a beam of light having different spectral characteristics than the other mode, wherein when the two modes are operated, the total spectral output enhances a visual characteristic of a target within an area surrounding the target;

a first mode of the at least two modes comprising a dulling mode;

a second mode of the at least two modes comprising a vivifying mode, wherein the target comprises a reflective surface having level of reflectivity and wherein the area surrounding the target comprises a reflective surface having a second level of reflectivity;

wherein the dulling mode comprises propagating a wavelength of light at a first duty cycle and the vivifying mode comprises propagating light at a second duty cycle, the first duty cycle being greater than the second duty cycle.

16. A method of operating a lighting device, comprising:

providing power to a light source comprising at least two modes of operation, each mode of operation comprising propagating a beam of light having different spectral characteristics than the other mode, wherein when the two modes are operated, the total spectral output enhances a visual characteristic of a target within an area surrounding the target;

a first mode of the at least two modes comprising a dulling mode;

a second mode of the at least two modes comprising a vivifying mode, wherein the target comprises a reflective surface having level of reflectivity and wherein the area surrounding the target comprises a reflective surface having a second level of reflectivity;

wherein the dulling mode comprises propagating a wavelength of light at a first duty cycle and the vivifying mode comprises propagating light at a second duty cycle, the first duty cycle being less than the second duty cycle.

17. A method of operating a lighting device, comprising:

providing power to a light source comprising at least two modes of operation, each mode of operation comprising propagating a beam of light having different spectral characteristics than the other mode, wherein when the two modes are operated, the total spectral output enhances a visual characteristic of a target within an area surrounding the target;

a first mode of the at least two modes comprising a dulling mode;

a second mode of the at least two modes comprising a vivifying mode, wherein the target comprises a reflective surface having a level of reflectivity and wherein the area surrounding the target comprises a reflective surface having a second level of reflectivity;

wherein the dulling mode comprises propagating a wavelength of light at a first duty cycle and the vivifying mode comprises propagating light at a second duty cycle, the first duty cycle being substantially the same as the second duty cycle.

18. A lighting device, comprising:

a plurality of light sources;

a control system configured to selectively provide power to the light sources, wherein the plurality of light sources and said control system are configured to switch between a plurality of spectral modes, each one of the plurality spectral modes configured to propagate light comprising a spectral characteristic having a level of brightness;

wherein the plurality of spectral modes comprises a discriminative pair of spectral modes providing contrasting color spectra which, when propagated on a target, enables color discernment of the target from a surrounding area;

wherein a first of the plurality of light sources corresponds to a first of the discriminative pair of spectral modes, and a second of the plurality of light sources corresponds to a second of the discriminative pair of spectral modes;

wherein the lighting device comprises a control circuit configured to regulate power provided to the first and second light sources, wherein the discriminative pair of spectral modes comprises a dulling mode and a vivifying mode; and wherein the dulling mode and vivifying mode comprise a preselected plurality of duty-cycle combinations that are selectively activatable by a user.

* * * * *